US007893669B2

(12) United States Patent
Osterhout et al.

(10) Patent No.: US 7,893,669 B2
(45) Date of Patent: Feb. 22, 2011

(54) EFFICIENT VOLTAGE CONVERTER METHODS AND STRUCTURES

(75) Inventors: Doug Osterhout, San Jose, CA (US); Tod Schiff, Beaverton, OR (US)

(73) Assignee: Analog Devices, Inc., Norwood, MA (US)

( * ) Notice: Subject to any disclaimer, the term of this patent is extended or adjusted under 35 U.S.C. 154(b) by 670 days.

(21) Appl. No.: 11/900,236

(22) Filed: Sep. 10, 2007

(65) Prior Publication Data

US 2009/0066307 A1    Mar. 12, 2009

(51) Int. Cl.
    G05F 1/613       (2006.01)
(52) U.S. Cl. .................... 323/272; 323/282; 323/290
(58) Field of Classification Search ............ 323/272, 323/290, 223, 224, 282, 283
    See application file for complete search history.

(56) References Cited

U.S. PATENT DOCUMENTS

| | | | | |
|---|---|---|---|---|
| 5,122,728 A | | 6/1992 | Ashley | 323/282 |
| 5,307,004 A | | 4/1994 | Carsten | 323/222 |
| 6,144,194 A | | 11/2000 | Varga | 232/285 |
| 6,147,886 A | | 11/2000 | Wittenbreder | 363/95 |
| 6,377,032 B1 | * | 4/2002 | Andruzzi et al. | 323/224 |
| 6,522,113 B1 | | 2/2003 | Betten | 323/282 |
| 6,545,450 B1 | | 4/2003 | Ledenev et al. | 323/272 |
| 6,593,724 B1 | | 7/2003 | Chen | 323/283 |
| 6,650,096 B2 | * | 11/2003 | Lee | 323/272 |
| 6,650,556 B2 | | 11/2003 | Dinh et al. | 363/65 |
| 6,696,823 B2 | | 2/2004 | Ledenev et al. | 323/272 |
| 6,753,723 B2 | | 6/2004 | Zhang | 327/540 |
| 6,781,354 B2 | | 8/2004 | Zhang | 323/224 |
| 6,894,464 B2 | | 5/2005 | Zhang | 323/268 |
| 6,965,219 B2 | | 11/2005 | Brooks et al. | 323/283 |
| 7,005,835 B2 | * | 2/2006 | Brooks et al. | 323/282 |
| 7,317,305 B1 | * | 1/2008 | Stratakos et al. | 323/282 |
| 7,443,146 B2 | * | 10/2008 | Wei et al. | 323/224 |
| 7,495,421 B2 | * | 2/2009 | Weng et al. | 323/272 |

OTHER PUBLICATIONS

Gallagher, John, "Coupled Indurctors Improve Multiphase Buck Efficiency", Power Electronics Technology (www.powerelectronics.com) Jan. 2006, pp. 36 and 38-42.
Sherman, Jeffrey D., et al., "Synchronous Rectification: Improving the Efficiency of Buck Converter", EDN Magazine, Design Feature: Mar. 14, 1996.
"DC-DC Converter Tutorial", Application Note 2031, Maxim Dallas Semiconductor, 13 pages, Oct. 19, 2000.
Dixon, Lloyd, "Coupled Inductor Design", Unitrode Corporation, May, 1993, pp. 8-1 through 8-4.

* cited by examiner

*Primary Examiner*—Harry Behm
(74) *Attorney, Agent, or Firm*—Koppel, Patrick, Heybl & Dawson

(57) ABSTRACT

Voltage converter are provided for efficient generation of voltage signals in a load. The converters are formed with a group of inductors and at least two sets of buck and sync transistors that are arranged with the group so that conducted currents through each of the sets are directed through a respective one of the inductors and further directed to magnetically couple induced currents in the respective inductor of at least an associated one of the sets. Efficiency is particularly enhanced with an operational mode that is directed to light load conditions. In this mode and in at least a selected one of the sets, the buck transistor is turned off throughout the operational mode and the sync transistor is turned off for at least the time that an associated buck transistor is turned on in an associated set which couples induced currents in the respective inductor of the selected set. Preferably, the sync transistor is turned off at the end of a selected time span that begins when the associated buck transistor is turned off.

4 Claims, 4 Drawing Sheets

EFFICIENT VOLTAGE CONVERTER METHODS AND STRUCTURES

BACKGROUND OF THE INVENTION

1. Field of the Invention

The present invention relates generally to voltage converters and, more particularly, to coupled-inductor voltage converters.

2. Description of the Related Art

Lightweight, reliable, and efficient power supplies are essential in many modern electronic systems. Linear power converters, based on the use of voltage or current dividers, are often used to provide high-quality output voltages. These converters, however, are inefficient because many of their elements operate in their active (linear) modes. Accordingly, their use is typically restricted to applications that have low power demands.

In contrast, switching converters provide output voltages with high efficiency because their operational states generally comprise a) a low voltage across a switch in an on state, and b) zero current through a switch in an off state. Switching converter components can be arranged to provide an output voltage that is lower than the input voltage (a buck converter) or to provide an output voltage that is higher than the input voltage (a boost converter).

The switches of these converters are often realized with power metal-oxide-semiconductor field effect transistors (MOSFETs) that are generally switched at high frequencies in order to reduce the size of other regulator components (e.g., filter inductors and capacitors). In order to provide a desired voltage, the transistor switches are often controlled with a pulse-width modulation feedback system.

Switching converters have become widely used in a variety of electronic devices (e.g., cell phones, digital cameras, portable computers, computer peripherals, network cards, routers, and set-top boxes) and, accordingly, there is a considerable demand for further improvements in their efficiency.

BRIEF SUMMARY OF THE INVENTION

The present invention is generally directed to efficient voltage converter methods and structures. The drawings and the following description provide an enabling disclosure and the appended claims particularly point out and distinctly claim disclosed subject matter and equivalents thereof.

DETAILED DESCRIPTION OF THE INVENTION

Method and structure embodiments for multiphase voltage converters are illustrated in FIGS. 1-6B. They are realized with a group of inductors, at least two sets of buck and sync transistors, and a controller configured to control each of the sets in first and second operational modes. These elements are arranged so that conducted currents through each of the sets are directed through a respective one of the inductors and further directed to magnetically couple induced currents in the respective inductor of at least an associated one of the sets.

In one of the operational modes, a buck transistor of a selected set is turned off throughout the mode and a synchronous (sync) transistor is turned on for at least the time that an associated buck transistor is turned on in an associated set that couples induced currents in a respective inductor of the selected set.

Figure 1:
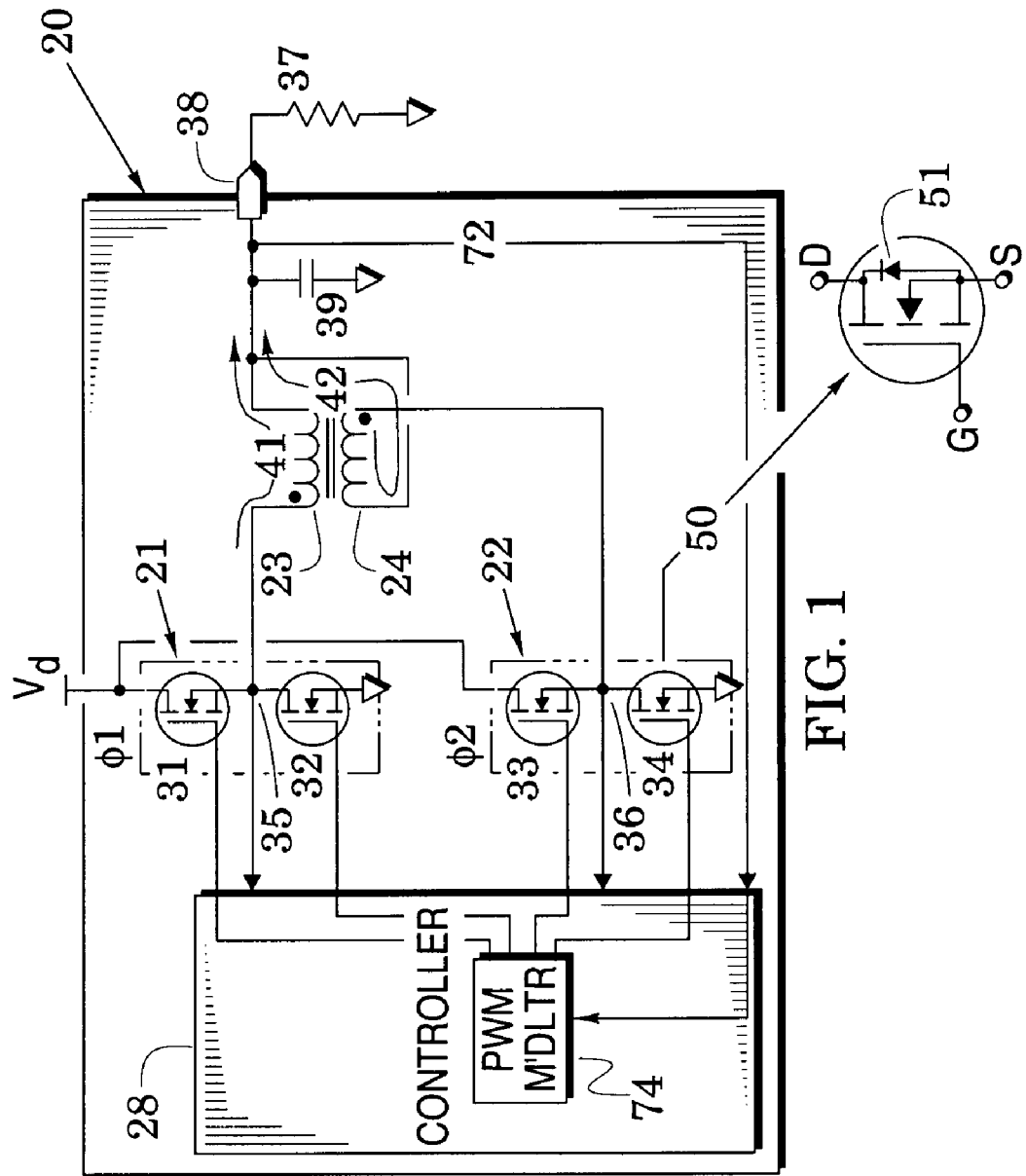
FIG. 1 is a schematic of an efficient voltage converter embodiment of the present invention.

To describe the method and structure embodiments, attention is initially directed to the converter structure of FIG. 1 after which the first and second operational modes of this structure will be investigated with the aid of FIGS. 2-5B. To simplify the wording of this description, references to converter structure will generally be understood to be referring to FIG. 1.

In particular, FIG. 1 illustrates a voltage converter 20 which has first and second sets 21 and 22 of buck and sync transistors, first and second inductors 23 and 24, a load capacitor 26, and a controller 28. The set 21 is formed with buck and sync transistors 31 and 32 and the set 22 is formed with buck and sync transistors 33 and 34.

In each of the sets 21 and 22, the buck transistor is coupled to the supply voltage $V_d$, the sync transistor is coupled to ground, and the buck and sync transistors are connected at a switch node to one side of a respective one of the inductors. Thus, the set 21 is coupled to the inductor 23 at a switch node 35 which is fed back to the controller 28 and the set 22 is coupled to the inductor 24 at a switch node 36 which is also fed back to the controller. The other ends of the inductors 23 and 24 are coupled to a load 37 via an output port 38 and are also coupled to a load capacitor 39 which is coupled to ground. It is noted that the resistor 37 is a general representation for any load (e.g., portable computer) that draws a current from the voltage presented at the output port 38.

The first and second inductors 23 and 24 are configured as coupled inductors. That is, they are configured so that they are magnetically coupled to each other. They are generally wound on a common core and the winding pattern, the shape of the core, and electromagnetic characteristics of the core (e.g., its permeability) may be selected to realize a desired degree of magnetic coupling. If the coupled inductors have a coupling factor of 50%, for example, then a conducted current through the inductor 23 will induce an induced current in the inductor 24 that is one half of the conducted current.

Dots are shown on the inductors 23 and 24 to indicate the direction of the magnetic coupling. As shown in FIG. 1, therefore, a conducted current 41 directed through the inductor 23 by the buck transistor 31 will magnetically couple an induced current 42 in the inductor 24 and these conducted and induced currents will drive the load capacitor 26 and the load 37 at the output port 38.

As shown in FIG. 1, the controller 28 can drive the gates of the buck and sync transistors of each of the sets 21 and 22. These transistors are generally power MOSFET devices which are structured to carry large currents and present an extremely low on-state resistance (e.g., a few tenths of an ohm) in response to a drive signal on their gates. The present invention particularly notes that these desirable operational parameters are generally obtained with a vertical internal structure which creates a parasitic body diode. To illustrate this point, an example arrow 50 in FIG. 1 points to an enlarged diagram of the sync transistor 34. This diagram labels the source (S), gate (G) and drain (D) terminals and shows the parasitic body diode 51 between the source and drain.

Figure 2:
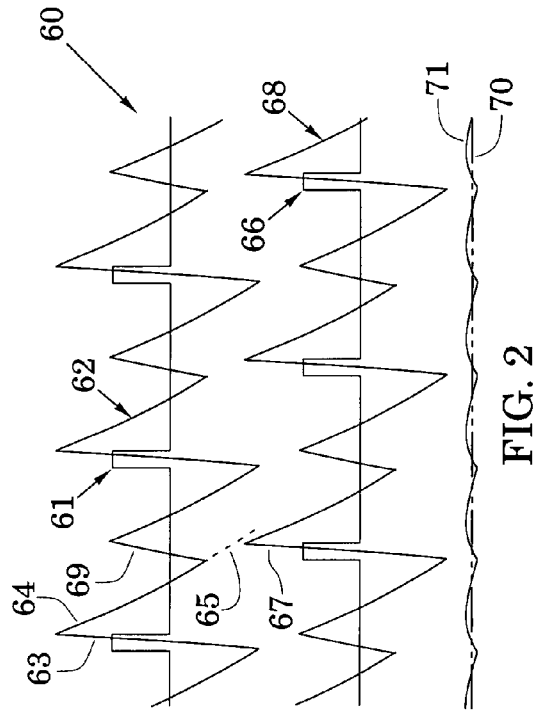
FIG. 2 is a graph of voltage and current waveforms when the converter of FIG. 1 is operating in medium-to-high load conditions.

FIG. 2 illustrates exemplary waveforms when the converter 20 of FIG. 1 is operated in the first operational mode. At a predetermined rate which establishes successive respective time periods of the set 21, the controller 28 turns on the buck transistor 31 during a first portion of each of the time periods and turns on the sync transistor 32 during the remaining second portion of each of the time periods. The resulting waveform at the switch node 35 of FIG. 1 is shown in the graphs 60 of FIG. 2 as the waveform 61. When the buck transistor 31 is on during the first portion, the voltage at the switch node 35 rises to nearly the supply voltage $V_d$. When the sync transistor 32 is on during the second portion, the voltage at the switch node 35 drops to nearly ground.

In response to the first portion of each time period of the waveform 61, a conducted current is directed through the inductor 23 by the buck transistor 31. The magnitude of this conducted current increases throughout the short first time portion as shown in the segment 63 of a waveform 62 which is the current through the inductor 23. During the second time portion when the buck transistor 31 is off and the sync transistor 32 is on, the current through the inductor 23 continues but now declines with time as indicated by the segment 64. In the absence of the set 22 of FIG. 1, this current would continue to decline as indicated by the broken line 65.

However, the controller 28 of FIG. 1 also directs the set 22 to define waveforms similar but offset in time to those just described. In particular, the buck and sync transistors 33 and 34 are successively turned on so that the resulting waveform at the switch node 36 is as shown by the waveform 66 in FIG. 2. The time offset is such that the waveform 66 is shifted 180 degrees in phase relative to the waveform 61.

In response to the first portion of each time period of the waveform 66, a conducted current is directed through the inductor 24 by the buck transistor 33. The magnitude of this conducted current increases throughout the short first time portion as shown in the segment 67 of a waveform 68 which is the current through the inductor 24. Due to the current rise during the segment 67, an induced current is magnetically coupled into the inductor 23. This coupling process was described above with the example of the conducted and induced currents 41 and 42 of FIG. 1. Because of the magnetic coupling, the waveform 62 does not continue to decline along the broken line 65 but, instead, it rises again as shown by the waveform segment 69.

The waveform 62 thus shows that conducted current in the inductor 23 rises during the first time portions when the buck transistor 31 is on and declines during the second time portions when the sync transistor 32 is on but these declines are interrupted by current increases (the waveform portion 69) which are magnetically induced by the magnetic coupling of the inductors 23 and 24. The same magnetic coupling causes the waveform 68 to have the same shape as the waveform 62 but shifted 180 degrees in phase.

The phase-shifted inductor currents represented by the waveforms 62 and 68 are filtered by the load capacitor 39 to generate a voltage level 70 at the output load 37 of FIG. 1 with a ripple component 71 shown in FIG. 2. The voltage level is a function of the first and second portions of the waveforms 61 and 66. Increasing the high first portion (and decreasing the low second portion) of these waveforms will raise the voltage level 70 and decreasing the high first portion will lower the voltage level 70. That is, the output voltage level 70 is a function of the duty cycles of the waveforms 62 and 68.

A desired duty cycle (and a desired output voltage) is typically realized with a feedback signal 72 that provides a sample of the output signal to the controller 28. In an exemplary feedback control method, this sample can be compared in the controller with a desired voltage to provide the difference which represents an error signal. This error signal is then used to appropriately adjust pulse waveforms which drive the gates of the buck and sync transistors 31 and 32 and 33 and 34. This waveform control is generally referred to as pulse-width modulation (PWM) and the error signal may, for example, be generated by comparing the level of the error signal with a sawtooth waveform.

Accordingly, the controller 28 of FIG. 1 preferably includes a PWM modulator 74 that receives the feedback signal 72 and, in response, generates the gate signals for the first and second sets 21 and 22 of buck and sync transistors. The modulator may include driver and inverter circuits to facilitate generation of the appropriate gate signals.

The phase-shifted current waveforms 62 and 68 are generated with the first and second sets 21 and 22 of buck and sync transistors which may also be referred to as first and second phases φ1 and φ2 as shown in FIG. 1. The use of a multiphase converter structure offers several advantageous. For example, it increases the frequency of the phase ripple (the ripple component 71 in FIG. 2) which facilitates a reduction of the amplitude of this ripple. Alternatively, the size of the inductors 23 and 24 can be reduced while maintaining the same ripple content. Reduction of the inductor sizes allows the converter to respond more quickly to transient disturbances in the output voltage level.

Adding coupled inductors to the multiphase structure not only facilitates further reduction of ripple content or further reduction of inductor size and consequent enhancement in the speed of transient reduction but also facilitate a reduction in switching speed which enhances converter efficiency.

Among other factors, converter efficiency is significantly degraded by switching losses and resistive or $I^2R$ losses. Because the switching losses are generated by switching in converter elements (e.g., sets 21 and 22, inductors 23 and 24, and capacitor 39), they are frequency dependent. In contrast, the $I^2R$ losses are generated by current flow through converter resistive elements (e.g., on-state resistance of the transistors of the sets 21 and 22, resistances in the inductors 23 and 24, and other circuit resistances). Accordingly, the $I^2R$ losses increase with output current so that in medium-to-high load conditions (medium-to-high output current), the $I^2R$ losses dominate. In light load conditions (light output current), the $I^2R$ losses drop off and the switching losses dominate.

Therefore, converter efficiency can be significantly increased during light load conditions by turning off one or more phases to thereby reduce the switching losses. This mode of operation is illustrated in the waveforms 80 of FIG. 3 which result when the second set 22 (φ2) is turned off. Accordingly, the buck and sync transistors 33 and 34 are off during this operational mode.

Figure 3:
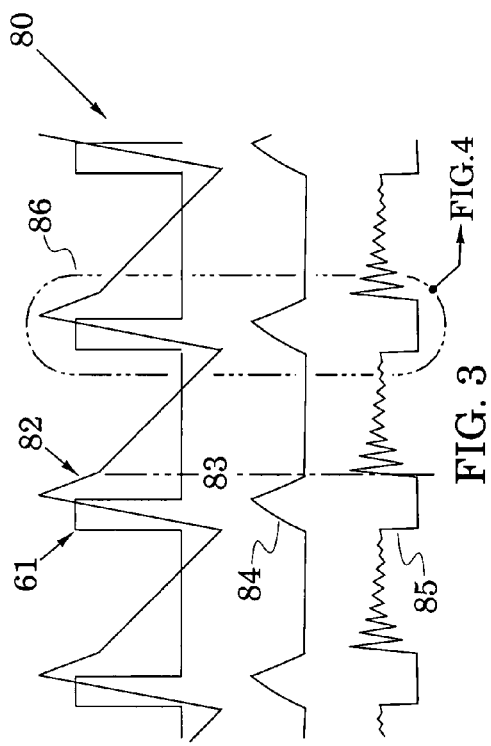
FIG. 3 is a graph of voltage and current waveforms when the converter of FIG. 1 is operating in light load conditions.

Because the first set 21 (φ1) is still operational, the waveform 61 of FIG. 2 is still present at the switch node 35 of FIG. 1. This waveform is shown in FIG. 3 along with a waveform 82 which is the current in the inductor 23 of FIG. 1. Because the second set 22 (φ2) is off, the waveform 82 does not include the induced waveform segment 69 that was present in FIG. 2. Instead, the current in the inductor 23 declines throughout the second portion of the successive waveform 61.

However, it is apparent that the decline in current changes slope at a time indicated by a broken vertical line 83. When the current through the second inductor 24 of FIG. 1 is sensed, it is found to define the waveform 84. Although the buck and sync transistors 33 and 34 are turned off in this operational mode, the waveform 84 shows that current increases in the second inductor 24 during the first portion of the successive waveform 82, declines during the second portion of the waveform 82, and reaches zero at the point where there is a slope change in the current waveform 82. When the voltage at the switch node 36 is plotted as waveform 85, it is apparent that it is somewhat negative when current is flowing in the second inductor 24 and rings as it returns to a zero level.

Figure 4:
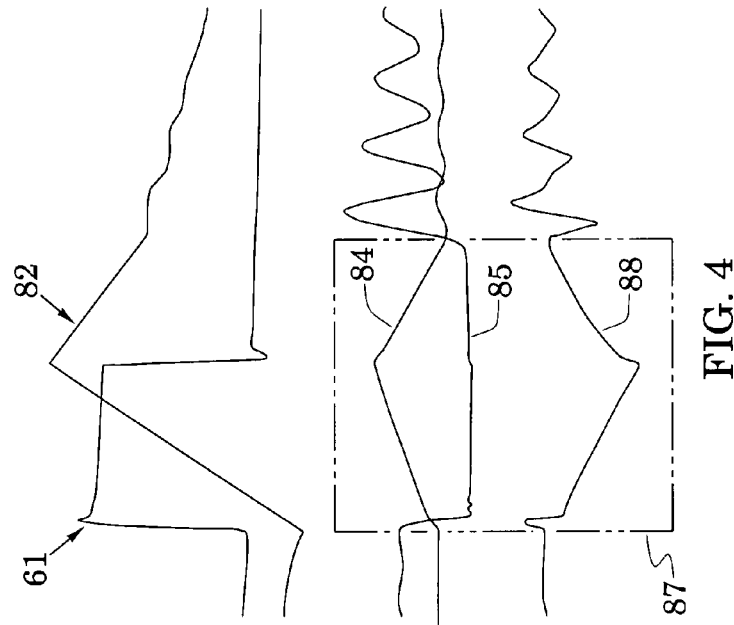
FIG. 4 is an enlargement of a portion of the graph of FIG. 3 that illustrates lost power in light load conditions.

To facilitate a closer inspection of these waveforms, the portions within the boundary 86 of FIG. 3 are enlarged and shown in FIG. 4 where attention is particularly directed to waveforms within a rectangle 87. Because the waveform 84 in this rectangle is the current flowing through the sync transistor 34 and the waveform 85 is the voltage across this sync transistor, their product, which is waveform 88, indicates the power lost in this sync transistor. For the currents, voltages and switching rate of an exemplary converter, it has been found that approximately 300 milliwatts is dissipated in the sync transistor 34.

The present invention recognizes that the body diode 51 in FIG. 1 is involved in the observed power loss. It is recognized that this diode becomes forward biased in response to the induced current in the inductor 24 that is induced by conducted current through the inductor 23. As the conducted current declines in the waveform 82, the induced current in the waveform 84 also declines to zero but does not decline further because the body diode is then reverse biased. This recognition is enhanced by the fact that the voltage drop in the waveform 85 is on the order of 600 millivolts. It may now be recognized that the slope discontinuity in the waveform 82 coincides with the cessation of current in the waveform 84 and thus results from the ending of magnetically induced currents in the inductors 23 and 24.

With this recognition, and in an important feature of the invention, the sync transistor 34 is intentionally turned on during the temporal extent of the current flow in the waveform 84 of FIGS. 3 and 4. Because the induced current now passes through the quite small on-state resistance of the sync transistor 34 rather than through the body diode 51, the voltage drop across the sync transistor drops significantly. Accordingly, power loss is substantially reduced and converter efficiency if substantially enhanced.

Operation of the voltage converter 20 of FIG. 1 is thereby modified to occur in at least two operational modes. The first operational mode is preferably used in the presence of medium-to-high load conditions. This first mode is directed to operations in each of at least two sets of buck and sync transistors that occur in successive respective time periods. It comprises the steps, for each set, of directing conducted currents through a respective inductor of a group of inductors, and magnetically coupling induced currents in the respective inductor of at least one other of the sets. For example, the set 21 directs conducted currents through the inductor 23 and it magnetically couples induced currents in the inductor 24.

Figures 5A, 5B:
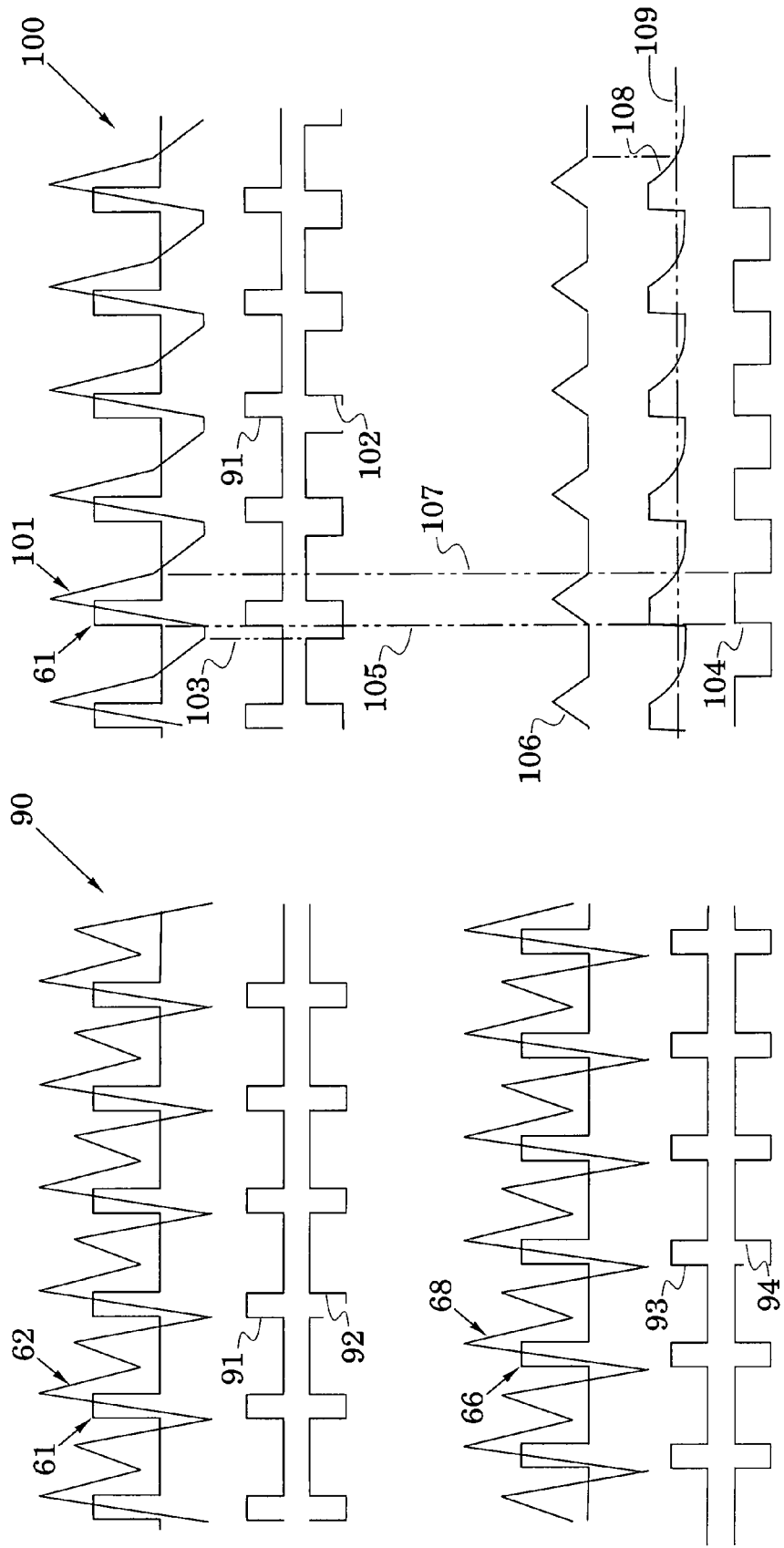
FIGS. 5A and 5B are graphs of voltage and current waveforms when a converter embodiment of the invention is respectively operating in first and second operational modes.

Waveforms of this operational mode are exemplified in the graph 90 of FIG. 5A. Waveforms 91 and 92 show PWM-derived command signals at the gates of the φ1 buck and sync transistors 31 and 32 and waveforms 93 and 94 show PWM-derived command signals at the gates of the φ2 buck and sync transistors 33 and 34 wherein the latter commands are phase shifted 180 degrees from the former commands. Because of these gate commands, voltage waveforms 61 and 66 appear at the switch nodes 35 and 36 and currents flow through the first and second inductors 23 and 24 as shown by waveforms 62 and 68 (waveforms 61, 62, 66 and 68 were previously shown in FIG. 2).

The second operational mode is preferably used in the presence of light load conditions when the currents flowing in the load 37 are substantially lower than in the first operational mode. This second mode is particularly directed to a selected set (e.g., the φ2 set 22) of buck and sync transistors that has a respective inductor (e.g., the second inductor 24) and an associated set (e.g., the φ1 set 21) of buck and sync transistors wherein an associated set is defined as one that magnetically induces currents in the inductors of the selected set.

In particular, the second mode modifies the first mode by:
 a) turning off the buck transistor of the selected set throughout the second operational mode; and
 b) turning on the sync transistor of the selected set for at least the time that an associated buck transistor is turned on in an associated set that couples induced currents in the respective inductor of the selected set.

The results of this operational mode are exemplified in the graphs 100 of FIG. 5B. As in FIG. 5A, waveform 91 continues to be the command signal at the gate of the φ1 buck transistor 31. However, the waveform 92 of FIG. 5A (the command signal at the gate of the φ1 sync transistor 32) is modified to a waveform 102 which begins at the times that the waveform 92 begins but terminates earlier as indicated by the broken vertical line 103.

The gate signal of the φ2 buck transistor 33 is set to keep this transistor off throughout the second operational phase (and is not shown in FIG. 5B) and the gate signal of the φ2 sync transistor 34 is modified from the waveform 94 in FIG. 5A to the waveform 104 in FIG. 5B. In response to the gate waveform 104, the φ2 sync transistor 34 turns on when the buck transistor 31 turns on as pointed out by the vertical broken line 105.

Waveform 106 in FIG. 5B indicates the induced current through the inductor 24. As indicated by the vertical broken line 105, this current begins at the time that waveform 101 shows that current begins to increase in inductor 23. The rise of these currents coincide because the current in inductor 24 is a magnetically-induced current. The waveform 106 then begins to decrease as the waveform 101 begins to decrease. The gate waveform 104 preferably terminates when waveform 106 indicates that current in the inductor 24 has declined to zero as indicated by the broken vertical line 107.

Thus the sync transistor 34 is on during the duration of the time that a current is induced in the inductor 24. By turning on the φ2 sync transistor when current is induced in the second inductor 24, the induced current is carried through this transistor 34 and not through its body diode 51. Accordingly, the voltage drop across the φ2 sync transistor is substantially reduced and the dissipated power is substantially reduced. It was stated above that 300 milliwatts was dissipated across the body diode 51 for a particular condition of load currents, load voltages and switching rate. It has been found that this 300 milliwatts of loss was reduced to considerably less than 100 milliwatts when the second operational mode was used.

In a converter embodiment, the controller 28 of FIG. 1 is configured to turn off the φ2 sync transistor 34 when the current of waveform 105 has dropped to zero. In one embodiment, this can be controlled by monitoring the voltage at the switching node 36 and turning off the φ2 sync transistor 34 when this switching node voltage drops to zero. In another converter embodiment, the controller 28 can be configured to turn off the φ2 sync transistor 34 at the end of a predetermined time span which begins when the φ1 buck transistor 31 is turned off.

This predetermined time span can be generated with various circuits in the controller 28. In an exemplary circuit, it can be determined by starting the decay of a circuit signal 108 when the φ1 buck transistor turns off and comparing the decaying circuit signal 108 to a threshold signal 109. A circuit in the controller 28 may be arranged to generate the circuit signal 108 with a suitable time constant (e.g., an RC or an RL time constant).

It was mentioned above that the φ1 sync transistor 32 preferably turns off earlier as pointed out by the vertical broken line 103. In light load conditions, the current through the φ1 sync transistor may decay to zero as indicated by the flat segment at the bottom of the waveform 101. If the φ1 sync transistor were left on after this point, it would begin to pull current from the load capacitor 39 and begin discharge of this capacitor. To prevent this discharge, the φ1 sync transistor is turned off when the current in the inductor 23 has declined to zero. The controller 28 can determine this as the time when the voltage at the switch node 35 has declined to zero.

Converter embodiments of the invention are directed to multiphase coupled-inductor voltage converters in which sets of buck and sync transistors are arranged with a group of inductors so that conducted currents through each set are directed through a respective one of the inductors and further directed to magnetically couple induced currents in the respective inductor of at least one associated set. For example, the converter 20 of FIG. 1 is arranged so that the set 21 directs currents through the inductor 23 and magnetically couples currents in the inductor 24. Inductors 23 and 24 are respective inductors of sets 21 and 22 and the set 22 is the associated set of the set 21.

Figures 6A, 6B:
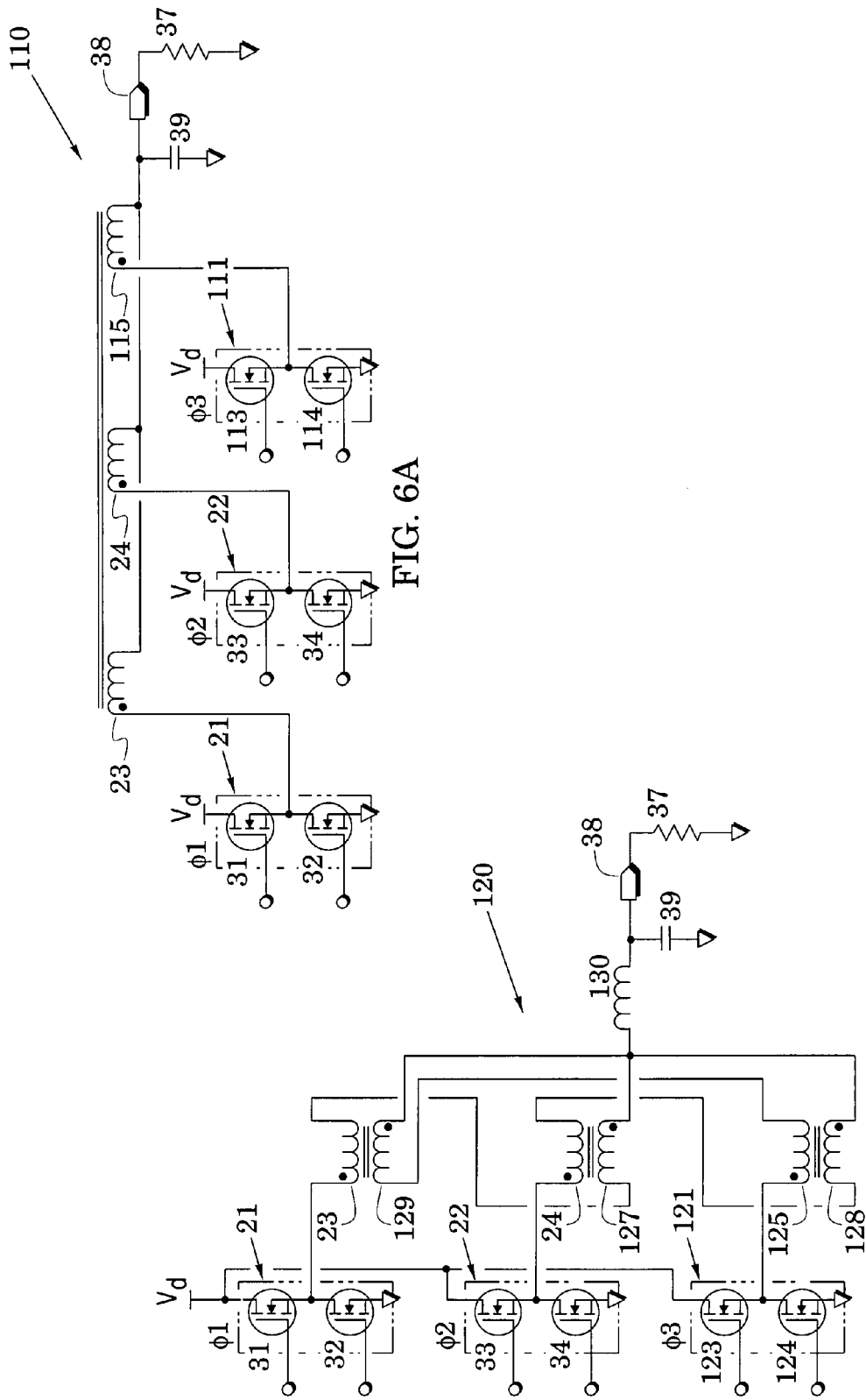
FIGS. 6A and 6B are arrangements of sets of transistors with a group of inductors that facilitate further converter embodiments.

Other exemplary arrangements of sets and a group of inductors are shown in FIGS. 6A and 6B. The arrangement 110 of FIG. 6A adds a set 111 of buck and sync transistors 113 and 114 to the sets 21 and 22 of FIG. 1. The group of inductors includes an inductor 115 that is coupled to the set 111. Inductors 23, 24 and 111 are coupled to the load capacitor 39 and, through the output port 38, to the load 37. Each of the inductors 23, 24 and 115 is magnetically coupled to the others so that a current through one of the inductors magnetically induces currents through inductors of associated sets.

The arrangement 120 of FIG. 6B adds a set 121 of buck and sync transistors 123 and 124 to the sets 21 and 22 of FIG. 1. The group of inductors includes an inductor 125 that is coupled to the set 121. Thus each of the sets 21, 22 and 121 directs a current through a respective one of the inductors 21, 22 and 125. The current of each set is further directed through a second inductor that is magnetically coupled to the inductor of an associated set.

For example, an inductor 127 is inserted between the inductor 23 and the output port 38 and is magnetically coupled to the inductor 24 of the set 22. In addition, an inductor 128 is inserted between the inductor 24 and the output port 38 and is magnetically coupled to the inductor 125 of the set 121. An inductor 129 is inserted between the inductor 125 and the output port 38 and is magnetically coupled to the inductor 23 of the set 21. In this embodiment, a filter inductor 130 has also been inserted to augment the signal filtering of the load capacitor 39.

Voltage converter embodiments have been disclosed that include a group of inductors and at least two sets of buck and sync transistors. In at least one operational mode, the buck transistor in at least a selected one of the sets is turned off and the sync transistor of the selected set is turned on for at least the time that an associated buck transistor is turned on in an associated set. The associated set is one that that couples induced currents in the respective inductor of the selected set.

Controllers of the embodiments may be realized with a variety of conventional structures such as arrays of gates and/or appropriately-programmed digital processors.

The embodiments of the invention described herein are exemplary and numerous modifications, variations and rearrangements can be readily envisioned to achieve substantially equivalent results, all of which are intended to be embraced within the spirit and scope of the appended claims.

We claim:

1. A method of efficiently generating a voltage signal, comprising the steps of:
   with each of at least two sets of buck and sync transistors and in successive respective time periods,
      directing conducted currents through a respective inductor of a group of inductors; and
      magnetically coupling induced currents in the respective inductor of at least one other of said sets;
   during at least one operational mode and in at least a selected one of said sets,
      turning off the buck transistor of said selected set throughout said operational mode; and
      turning on the sync transistor of said selected set for at least the time that an associated buck transistor is turned on in an associated set that couples induced currents in the respective inductor of said selected set; and
   providing the conducted and induced currents of said sets to a load to thereby efficiently generate said voltage signal;
   wherein said turning on step includes the steps of:
   turning on the sync transistor of said selected set when said associated buck transistor turns on; and
   turning off the sync transistor of said selected set at the end of a time span that begins when said associated buck transistor is turned off;
   and further including the step of determining said time span by the decay of a circuit signal to a predetermined threshold signal, wherein said determining step includes the step of configuring said circuit signal to decay in accordance with a selected one of an RC time constant and an RL time constant.

2. The method of claim 1, wherein the number of said sets is greater than two.

3. A voltage converter that efficiently generates a voltage signal in a load, comprising:
   a group of inductors;
   at least two sets of buck and sync transistors that are arranged with said group so that conducted currents through each of said sets are directed through a respective one of said inductors and further directed to magnetically couple induced currents in the respective inductor of at least one associated one of said sets;
   a controller configured to control each of said sets in first and second operational modes wherein:
      in said first operational mode, said controller, in successive respective time periods of each of said sets,
         a) commands the buck transistor on during a first portion of each of said time periods; and
         b) commands the sync transistor on during a subsequent second portion of each of said time periods;
      and in said second operational mode, said controller, in at least a selected one of said sets,
         a) turns off the buck transistor throughout said second operational mode; and
         b) turns on the sync transistor for at least the time that an associated buck transistor is turned on in an associated set that couples induced currents in the respective inductor of said selected set; and a load capacitor arranged to receive conducted and induced currents of all of said sets and hold said voltage signal across said load;

wherein said controller, in said second operational mode, is configured to:

turn on the sync transistor of said selected set when said associated buck transistor turns on; and turn off the sync transistor of said selected set at the end of a time span that begins when said associated buck transistor is turned off;

and wherein said time span is determined by the decay of a circuit signal to a predetermined threshold signal, wherein said circuit signal is configured to decay in accordance with a selected one of an RC time constant and an RL time constant.

4. The converter of claim 3, wherein the number of said sets is greater than two.

* * * * *